United States Patent
Lee et al.

(10) Patent No.: US 11,379,639 B2
(45) Date of Patent: Jul. 5, 2022

(54) APPARATUS AND METHOD OF GENERATING CONTROL PARAMETER OF SCREEN PRINTER

(71) Applicant: KOH YOUNG TECHNOLOGY INC., Seoul (KR)

(72) Inventors: Duk Young Lee, Suwon-si (KR); Chan Woo Park, Seoul (KR); Tae Min Choi, Seoul (KR); Joanna Hong, Gumi-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 866 days.

(21) Appl. No.: 16/229,421

(22) Filed: Dec. 21, 2018

(65) Prior Publication Data

US 2019/0269017 A1 Aug. 29, 2019

(30) Foreign Application Priority Data

Feb. 26, 2018 (KR) .................. 10-2018-0023093
Dec. 5, 2018 (KR) .................. 10-2018-0154834

(51) Int. Cl.
*G06F 30/27* (2020.01)
*G06F 30/398* (2020.01)
(Continued)

(52) U.S. Cl.
CPC .............. *G06F 30/27* (2020.01); *G06F 30/30* (2020.01); *G06F 30/337* (2020.01);
(Continued)

(58) Field of Classification Search
None
See application file for complete search history.

(56) References Cited

U.S. PATENT DOCUMENTS 5,751,910 A * 5/1998 Bryant ................. G06N 3/0436
706/2
6,587,580 B1 7/2003 Nikmanesh
(Continued)

FOREIGN PATENT DOCUMENTS

CN 1795099 6/2006
CN 101045360 10/2007
(Continued)

OTHER PUBLICATIONS

A. Lotfi et al., "An Intelligent Closed-Loop Control of Solder Paste Stencil Printing," 1998 IEEE/CPMT Int'l Electronics Manufacturing Technology Symposium, pp. 87-91. (Year: 1998).*
(Continued)

*Primary Examiner* — Leigh M Garbowski
(74) *Attorney, Agent, or Firm* — Kile Park Reed & Houtteman PLLC

(57) ABSTRACT

An apparatus, a recording medium, and a method for generating a control parameter of a screen printer are disclosed. The apparatus includes a memory that stores a simulation model configured to derive predictive inspection information on a printed state of solder paste based on a plurality of control parameters of the screen printer; a communication circuit configured to receive first inspection information on a plurality of solder pastes printed by the screen printer based on a first control parameter, and a processor electrically connected to the memory and the communication circuit. The processor obtains first predictive inspection information by applying the first control parameter to the simulation model, generates a plurality of candidate control parameters based on the first predictive inspection information, determines a plurality of second control parameters among the candidate control parameters, and transmits the
(Continued)

plurality of second control parameters to the screen printer via the communication circuit.

19 Claims, 12 Drawing Sheets

(51) Int. Cl.
| | |
|---|---|
| H05K 3/00 | (2006.01) |
| H05K 13/08 | (2006.01) |
| G01N 21/956 | (2006.01) |
| H05K 3/12 | (2006.01) |
| G06F 30/337 | (2020.01) |
| G06F 30/3308 | (2020.01) |
| G06F 30/30 | (2020.01) |
| G06F 119/00 | (2020.01) |
| G06F 119/18 | (2020.01) |

(52) U.S. Cl.
CPC ........ *G06F 30/3308* (2020.01); *G06F 30/398* (2020.01); *H05K 3/0005* (2013.01); *H05K 3/1216* (2013.01); *G01N 2021/95646* (2013.01); *G01N 2021/95669* (2013.01); *G06F 2119/00* (2020.01); *G06F 2119/18* (2020.01); *H05K 13/0817* (2018.08)

(56) References Cited

U.S. PATENT DOCUMENTS

| | | | | |
|---|---|---|---|---|
| 7,171,897 | B2* | 2/2007 | Barajas | H05K 3/1233 |
| | | | | 427/8 |
| 9,681,553 | B2* | 6/2017 | Greer | H05K 3/0091 |
| 2004/0237813 | A1 | 12/2004 | Maeda et al. | |
| 2004/0244613 | A1 | 12/2004 | Barajas et al. | |
| 2007/0090164 | A1* | 4/2007 | Barajas | H05K 3/1233 |
| | | | | 228/101 |
| 2007/0177789 | A1 | 8/2007 | Harrell et al. | |
| 2008/0083816 | A1* | 4/2008 | Leinbach | H05K 3/1233 |
| | | | | 228/8 |
| 2014/0115874 | A1 | 5/2014 | Narita et al. | |
| 2015/0050418 | A1 | 2/2015 | Greer et al. | |

FOREIGN PATENT DOCUMENTS

| | | |
|---|---|---|
| CN | 103796439 | 5/2014 |
| CN | 104105359 | 10/2014 |
| CN | 104427774 | 3/2015 |
| CN | 104669774 | 6/2015 |
| CN | 105073423 | 11/2015 |
| EP | 2 790 473 | 10/2014 |
| EP | 2 881 256 | 6/2015 |
| EP | 2 977 206 | 1/2016 |
| JP | 1-141739 | 6/1989 |
| JP | 4-44848 | 2/1992 |
| JP | 2001-347645 | 12/2001 |
| JP | 2010-008587 | 1/2010 |

OTHER PUBLICATIONS

European Search Report corresponding to Application No. EP 18 21 5551, dated May 9, 2019.
Caifeng Liu, "Relevance Model of the Electrical Properties with Printed Quality of Solar Cell Gate Line", Piezoelectrics & Acoustooptics, Apr. 2011, vol. 33, No. 2; pp. 305-309.
Chinese Office Action, with English translation, corresponding to Chinese Application No. or Publication No. 201811582073.0, dated Jul. 13, 2020.
Korean Office Action, with English translation, corresponding to Korean Application No. 10-2018-0154834, dated Feb. 27, 2020.

* cited by examiner

FIG. 10

| First candidate control parameter | Second candidate control parameter | Third candidate control parameter |
|---|---|---|
| $P_{O1}$ | $P_{L1}$ | $P_{R1}$ |
| $P_{O2}$ | $P_{L2}$ | $P_{R2}$ |
| $P_{O3}$ | $P_{L3}$ | $P_{R3}$ |
| ⋮ | ⋮ | ⋮ |
| $P_{O9}$ | $P_{L9}$ | $P_{R9}$ |
| $P_{O10}$ | $P_{L10}$ | $P_{R10}$ |

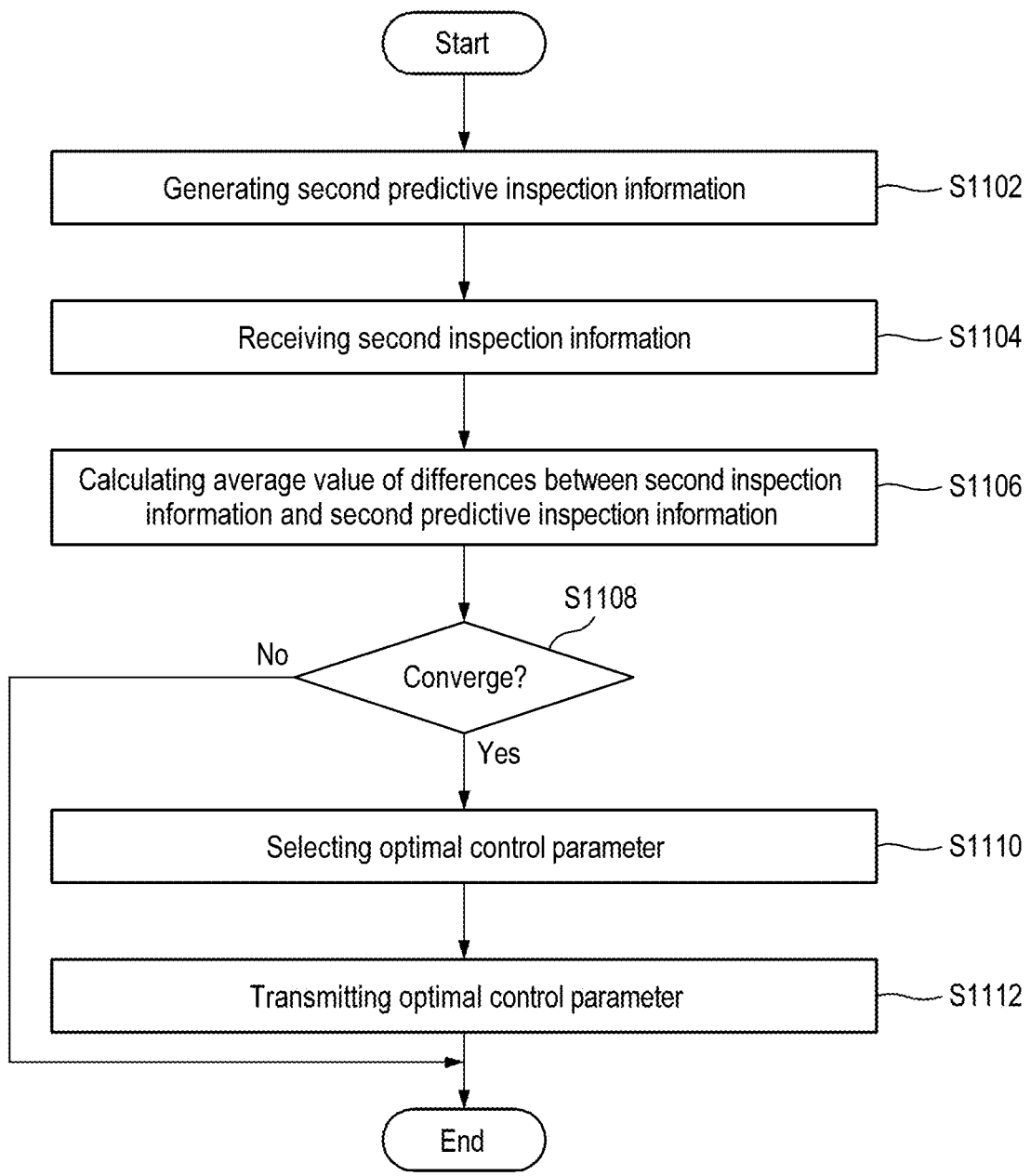

APPARATUS AND METHOD OF GENERATING CONTROL PARAMETER OF SCREEN PRINTER

CROSS-REFERENCE TO RELATED APPLICATION(S)

The present application claims priority from Korean Patent Application Nos. 10-2018-0023093 (filed on Feb. 26, 2018) and 10-2018-0154834 (filed on Dec. 5, 2018), the entire subject matters of which are incorporated herein by reference.

TECHNICAL FIELD

The present disclosure relates to an apparatus, a recording medium, and a method for generating a control parameter of a screen printer that prints solder paste on a substrate.

The present disclosure is derived from research conducted under the Robot Industry Fusion Core Technology Development Project of the Ministry of Trade, Industry, and Energy of Korea [Project number: 10077589, Project title: Development of technology for machine learning-based SMT optimization system].

BACKGROUND

Generally, a process of mounting electronic components on a printed circuit board is performed in such an order that a solder is applied to a pad of a printed circuit board through a solder printer (i.e., a screen printer), the state of the applied solder is inspected using a solder inspection device, and then electronic components are mounted on the printed circuit board with the solder applied.

The screen printer positions the printed circuit board on a table for fixing the printed circuit board (bare board) and arranges a stencil mask on the printed circuit board so that an opening of the stencil mask is located on the corresponding pad of the printed circuit board. Next, the screen printer moves a squeegee blade by controlling a pressure and moving speed of the squeegee blade based on a control parameter, and separates the stencil mask from the printed circuit board by controlling a separation speed between the stencil mask and the printed circuit board.

SUMMARY

In printing the solder paste using the screen printer, a larger or smaller amount of solder paste than a reference amount may be printed on pads of a printed circuit board or solder paste may be printed at an inappropriate position depending on control parameters. Further, a defect may occur in a solder printed on pads of the printed circuit board depending on the ambient conditions (e.g., temperature or humidity) of the screen printer or the type of the stencil mask.

Various exemplary embodiments of the present disclosure have been made in order to solve the above-mentioned problems and other problems and may provide an apparatus, a recording medium, and a method for generating a control parameter to control a screen printer using a simulation model that simulates actual conditions of the screen printer.

In accordance with one exemplary embodiment of the present disclosure, an apparatus for generating a control parameter for a screen printer may include: a memory that stores a simulation model configured to derive predictive inspection information on printed states of a plurality of virtual solder pastes based on a plurality of control parameters of the screen printer; a communication circuit configured to receive first inspection information on printed states of a plurality of solder pastes, the plurality of solder pastes being printed by the screen printer based on a first control parameter; and a processor electrically connected to the memory and the communication circuit, wherein the processor is configured to: obtain first predictive inspection information on a printed state of a first virtual solder paste by applying the first control parameter to the simulation model; generate a plurality of candidate control parameters based on the first predictive inspection information; determine a plurality of second control parameters among the plurality of candidate control parameters based on the first inspection information and the first predictive inspection information; and transmit the plurality of second control parameters to the screen printer via the communication circuit.

According to one exemplary embodiment, each of the first control parameter and the second control parameter may include at least one of a pressure applied to a squeegee blade of the screen printer, a moving speed of the squeegee blade, and a separation speed between a stencil mask of the screen printer and a substrate.

According to one exemplary embodiment, the first inspection information may include at least one of a volume, an area, a height, a width, and a slope of each of the solder pastes.

According to one exemplary embodiment, the first predictive inspection information may include at least one of the volume, the area, the height, the width, and the slope of each of the first virtual solder pastes.

According to one exemplary embodiment, the processor may be further configured to: calculate a difference between the first inspection information and the first predictive inspection information; compare the calculated difference with a predetermined threshold value; update the simulation model using the first inspection information and the first predictive inspection information if it is determined that the calculated difference is greater than the predetermined threshold value.

According to one exemplary embodiment, the simulation model may include a machine learning-based regression model that is trained to derive predictive inspection information indicating predicted printed states of the plurality of virtual solder pastes based on the plurality of control parameters of the screen printer.

According to one exemplary embodiment, the memory may further store an optimization algorithm and a search algorithm to generate the plurality of candidate control parameters for the screen printer, and the processor may be further configured to: generate a plurality of first candidate control parameters by applying the first predictive inspection information to the optimization algorithm; and generate a plurality of second candidate control parameters by applying the first predictive inspection information to the search algorithm.

According to one exemplary embodiment, the processor may be further configured to: calculate a difference between the first inspection information and the first predictive inspection information; compare the calculated difference with a predetermined threshold value to generate a comparison result; and determine the plurality of second control parameters among the plurality of first candidate control parameters and the plurality of second candidate control parameters based on the comparison result.

According to one exemplary embodiment, the processor may be further configured to: select a first number of first candidate control parameters from among the plurality of first candidate control parameters, if it is determined that the calculated difference is greater than the predetermined threshold value; select a second number of second candidate control parameters from among the plurality of second candidate control parameters, wherein the second number is greater than the first number; and determine the plurality of second control parameters based on the selected first candidate control parameters and the selected second candidate control parameters.

According to one exemplary embodiment, the processor may be further configured to: select a first number of first candidate control parameters from among the plurality of first candidate control parameters, if it is determined that the calculated difference is less than or equal to the predetermined threshold value; select a second number of second candidate control parameters from among the plurality of second candidate control parameters, wherein the second number is smaller than the first number; and determine the plurality of second control parameters based on the selected first candidate control parameters and the selected second candidate control parameters.

According to one exemplary embodiment, the memory may further store an optimization algorithm and a machine learning-based reinforcement learning algorithm to generate the plurality of candidate control parameters for the screen printer, and the processor may be further configured to: generate a plurality of first candidate control parameters by applying the first predictive inspection information to the optimization algorithm; and generate a plurality of second candidate control parameters by applying the first control parameter and the first predictive inspection information to the machine learning-based reinforcement learning algorithm.

According to one exemplary embodiment, the processor may be further configured to: calculate a difference between the first inspection information and the first predictive inspection information; compare the calculated difference with a predetermined threshold value to generate a comparison result; and determine the plurality of second control parameters among the plurality of first candidate control parameters and the plurality of second candidate control parameters based on the comparison result.

According to one exemplary embodiment, the processor may be further configured to: select a first number of first candidate control parameters from among the plurality of first candidate control parameters. if it is determined that the calculated difference is greater than a predetermined threshold value; select a second number of second candidate control parameters from among the plurality of second candidate control parameters, where the second number is greater than the first number; and determine the plurality of second control parameters based on the selected first candidate control parameters and the selected second candidate control parameters.

According to one exemplary embodiment, the processor may be further configured to: select a first number of first candidate control parameters from among the plurality of first candidate control parameters, if it is determined that the calculated difference is less than or equal to the predetermined threshold value; select a second number of second candidate control parameters from among the plurality of second candidate control parameters, where the second number is smaller than the first number; and determine the plurality of second control parameters based on the selected first candidate control parameters and the selected second candidate control parameters.

According to one exemplary embodiment, if it is determined that the calculated difference is less than or equal to the predetermined threshold value, the processor may be configured to update the machine learning-based reinforcement learning algorithm based on the simulation model.

According to one exemplary embodiment, the memory may further store a search algorithm and a machine learning-based reinforcement learning algorithm to generate the plurality of candidate control parameters for the screen printer, and the processor may be further configured to: generate a plurality of first candidate control parameters by applying the first predictive inspection information to the search algorithm; and generate a plurality of second candidate control parameters by applying the first control parameter and the first predictive inspection information to the machine learning-based reinforcement learning algorithm.

According to one exemplary embodiment, the processor may be configured to: calculate a difference between the first inspection information and the first predictive inspection information; calculate a difference between the first inspection information and the first predictive inspection information; compare the calculated difference with a predetermined threshold value to generate a comparison result; and determines the plurality of second control parameters among the plurality of first candidate control parameters and the plurality of second candidate control parameters based on the comparison result.

According to one exemplary embodiment, the processor may be configured to: select a first number of first candidate control parameters from among the plurality of first candidate control parameters, if it is determined that the calculated difference is greater than the predetermined threshold value; select a second number of second candidate control parameters from among the plurality of second candidate control parameters, where the second number is greater than the first number; and determine the plurality of second control parameters based on the selected first candidate control parameters and the selected second candidate control parameters.

According to one exemplary embodiment, the processor may be configured to: select a first number of first candidate control parameters from among the plurality of first candidate control parameters, if it is determined that the calculated difference is less than or equal to the predetermined threshold value; select a second number of second candidate control parameters from among the plurality of second candidate control parameters, where the second number is smaller than the first number; and determine the plurality of second control parameters based on the selected first candidate control parameters and the selected second candidate control parameters.

According to one exemplary embodiment, the processor may be configured to update the machine learning-based reinforcement learning algorithm based on the simulation model, if it is determined that the calculated difference is less than or equal to the predetermined threshold value.

According to one exemplary embodiment, the memory may further store an optimization algorithm, a search algorithm, and a machine learning-based reinforcement learning algorithm to generate the plurality of candidate control parameters for the screen printer, and the processor may be further configured to: generate a plurality of first candidate control parameters by applying the first predictive inspection information to the optimization algorithm; generate a plurality of second candidate control parameters by applying the first predictive inspection information to the search algorithm; and generate a plurality of third candidate control parameters by applying the first control parameter and the first predictive inspection information to the machine learning-based reinforcement learning algorithm.

According to one exemplary embodiment, the processor may be configured to: calculate a difference between the first inspection information and the first predictive inspection information; compare the calculated difference with a predetermined threshold value to generate a comparison result; and determine the plurality of second control parameters among the plurality of first candidate control parameters, the plurality of second candidate control parameters, and the plurality of third candidate control parameters based on the comparison result.

According to one exemplary embodiment, the processor may be configured to: select a first number of first candidate control parameters from among the plurality of first candidate control parameters, if it is determined that the calculated difference is greater than the determined threshold value; select a second number of second candidate control parameters from among the plurality of second candidate control parameters, where the second number is greater than the first number; select the second number of third candidate control parameters from among the plurality of third candidate control parameters; and determine the plurality of second control parameters based on the selected first candidate control parameters, the selected second candidate control parameters, and the selected third candidate control parameters.

According to one exemplary embodiment, the processor may be configured to: select a first number of first candidate control parameters from among the plurality of first candidate control parameters, if it is determined that the calculated difference is less than or equal to the predetermined threshold value; select a second number of second candidate control parameters from among the plurality of second candidate control parameters, where the second number is smaller than the first number; select the second number of third candidate control parameters from among the plurality of third candidate control parameters; and determine the plurality of second control parameters based on the selected first candidate control parameters, the selected second candidate control parameters, and the selected third candidate control parameters.

According to one exemplary embodiment, the processor may be configured to update the machine learning-based reinforcement learning algorithm based on the simulation model, if it is determined that the calculated difference is less than or equal to the predetermined threshold value.

According to one exemplary embodiment, the communication circuit may be configured to receive second inspection information corresponding to each of the plurality of second control parameters, and the processor may be further configured to obtain second predictive inspection information on a printed state of a second virtual solder paste by applying each of the plurality of second control parameters to the simulation model.

According to one exemplary embodiment, the processor may be further configured to: calculate an average value of the differences between the second inspection information and the second predictive inspection information; select one of the plurality of second control parameters if the calculated average value corresponds to a predetermined value; and transmit the selected second control parameter to the screen printer through the communication circuit.

According to one exemplary embodiment, the processor may be configured to: calculate a Z-score of each of the plurality of second control parameters; and select a second control parameter having the highest Z-score among the calculated Z-scores.

In accordance with another exemplary embodiment of the present disclosure, a non-transitory computer-readable recording medium may record a program to be implemented on a computer, wherein the program may include an executable command, when executed by a processor, to cause the processor to perform: obtaining first predictive inspection information on a printed state of a virtual solder paste by applying a first control parameter of the screen printer to a simulation model, the simulation model being associated with generating predictive inspection information on printed states of a plurality of virtual solder pastes based on a plurality of control parameters of the screen printer; receiving first inspection information on printed states of a plurality of solder pastes, the plurality of solder pastes being printed by the screen printer based on the first control parameter; generating a plurality of candidate control parameters based on the first predictive inspection information; determining a plurality of second control parameters among the plurality of candidate control parameters based on the first inspection information and the first predictive inspection information; and transmitting the plurality of second control parameters to the screen printer.

According to one exemplary embodiment, the program may further include an executable command to cause the processor to perform: an operation of calculating a difference between the first inspection information and the first predictive inspection information; an operation of comparing the calculated difference with a predetermined threshold value; and an operation of updating the simulation module using the first inspection information and the first predictive inspection information if it is determined that the calculated difference is greater than the predetermined threshold value.

According to one exemplary embodiment, the operation of generating the plurality of candidate control parameters based on the first predictive inspection information may include: an operation of generating a plurality of first candidate control parameters by applying the first predictive inspection information to an optimization algorithm; an operation of generating a plurality of second candidate control parameters by applying the first predictive inspection information to a search algorithm; and an operation of generating a plurality of third candidate control parameters by applying the first control parameter and the first predictive inspection information to a machine learning-based reinforcement learning algorithm.

According to one exemplary embodiment, the program may further include an executable command to cause the processor to perform: an operation of receiving second inspection information on the plurality of solder pastes printed by the screen printer based on each of the plurality of second control parameters; an operation of obtaining second predictive inspection information on the printed state of the solder paste by applying each of the plurality of second control parameters to the simulation model; an operation of calculating an average value of differences between the second inspection information and the second predictive inspection information; an operation of selecting one of the plurality of second control parameters if the calculated average value corresponds to a predetermined value; and an operation of transmitting the selected second control parameter to the screen printer.

In accordance with still another exemplary embodiment of the present disclosure, a method of generating a control parameter of a screen printer may include: obtaining first predictive inspection information on a printed state of a virtual solder paste by applying a first control parameter of the screen printer to a simulation model, the simulation model being associated with generating predictive inspection information on printed states of a plurality of virtual solder pastes based on a plurality of control parameters of the screen printer; receiving first inspection information on printed states of a plurality of solder pastes, the plurality of solder pastes being printed by the screen printer based on the first control parameter; generating a plurality of candidate control parameters based on the first predictive inspection information; determining a plurality of second control parameters among the plurality of candidate control parameters based on the first inspection information and the first predictive inspection information; and transmitting the plurality of second control parameters to the screen printer.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 10 illustrates an example of a plurality of candidate control parameters according to one exemplary embodiment of the present disclosure.

FIG. 11 is a flowchart illustrating a method of selecting an optimal control parameter from among a plurality of control parameters according to one exemplary embodiment of the present disclosure.

DETAILED DESCRIPTION

Figure 1:
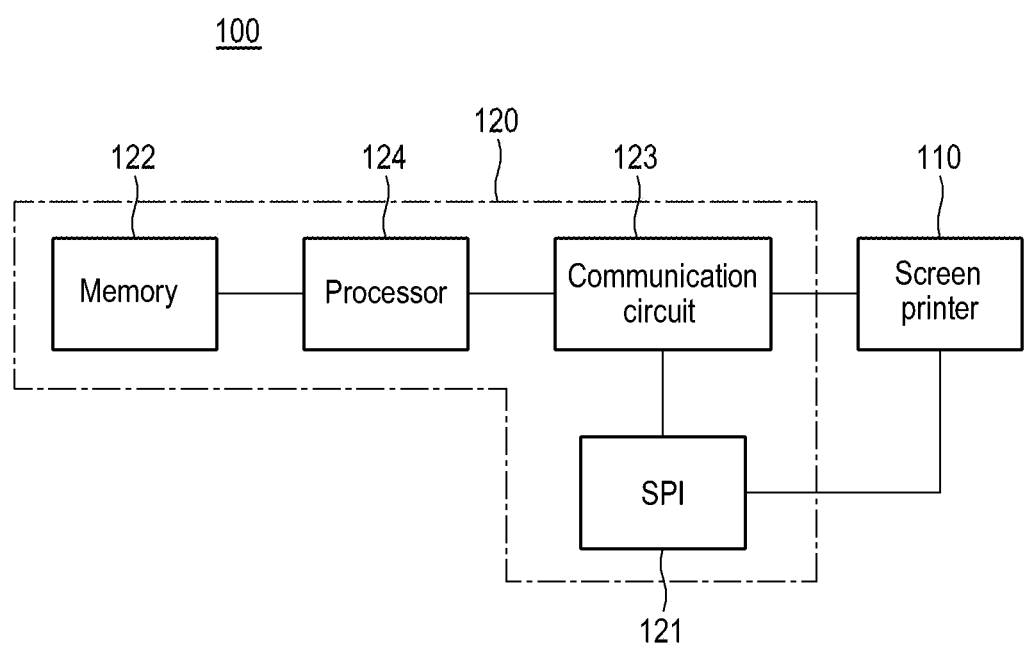
FIG. 1 is a block diagram schematically illustrating a configuration of an inspection system according to one exemplary embodiment of the present disclosure.

Exemplary embodiments of the present disclosure are illustrated for the sake of describing the technical idea of the present disclosure. The scope of the present disclosure is not limited by exemplary embodiments presented below or the detailed description of these exemplary embodiments.

Unless defined otherwise, all technical and scientific terms used herein have the same meaning as those commonly understood by a person skilled in the art to which the present disclosure pertains. All terms used herein are selected to clearly describe the present disclosure and should not be interpreted to limit the scope of the present disclosure.

The expressions "including", "comprising", "having", and the like used herein should be construed as open-ended terms not intended to exclude the existence of other exemplary embodiments unless indicated otherwise in phrases or sentences including such expressions.

It is to be understood that the singular expression used herein may include the plural meaning unless the context clearly dictates otherwise; this is also applicable to singular expressions recited in the claims.

The expressions "first", "second", and the like used herein do not limit the importance or order of a plurality of components and are used to distinguish a component from one another.

The term "unit" used herein refers to a software element or a hardware element, such as a Field-Programmable Gate Array (FPGA) or an Application-Specific Integrated Circuit (ASIC). However, the "unit" is not limited to software or hardware. The "unit" may be configured either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements or "unit", or divided into additional elements or "unit".

The expression "based on" used herein is used to describe one or more factors that affect a decision, a judgment, or an operation described in a phrase or sentence including this expression and does not exclude the existence of an additional factor that affects the decision, the judgment, or the operation.

It should be understood that when an element is referred to as being "connected" or "coupled" to another element, the element may be directly connected or coupled to the other element or may be connected or coupled to the other element via any other intervening element.

Hereinafter, exemplary embodiments of the present disclosure will be described with reference to the accompanying drawings. In the accompanying drawings, like reference numerals refer to like elements. In describing the following exemplary embodiments, redundant descriptions of like elements may be omitted. However, even though a description of components is omitted, such components are not construed as not being included in a certain exemplary embodiment.

FIG. 1 is a block diagram schematically illustrating a configuration of an inspection system according to one exemplary embodiment of the present disclosure. Referring to FIG. 1, an inspection system 100 may include a screen printer 110 and a control parameter generation device 120.

When a substrate (bare substrate, hereinafter referred to as a "printed circuit board") is transferred from the outside, the screen printer 110 prints solder paste on a plurality of pads of the transferred printed circuit board. The screen printer 110 may include a squeegee blade and a stencil mask. The screen printer 110 may print the solder paste on the printed circuit board located below the stencil mask through a plurality of openings of the stencil mask by moving the squeegee blade.

In one exemplary embodiment, the screen printer 110 may print the solder paste on the plurality of pads of the printed circuit board according to control parameters. For example, the control parameters may include at least one of a pressure applied to the squeegee blade, a moving speed of the squeegee blade, and a separation speed between the stencil mask and the printed circuit board. However, the control parameters are not necessarily limited thereto. The control parameters may include various parameters related to printing of the solder paste.

The control parameter generation device 120 may be connected to the screen printer 110 through a network (not shown) via wireless communication or wired communication. The wireless communication may include, for example, cellular communication (e.g., LTE, LTE Advanced (LTE-A), Code Division Multiple Access (CDMA), Wideband CDMA (WCDMA), Universal Mobile Telecommunications System (UMTS), and Wireless Broadband (WiBro)). The wireless communication may also include short-range wireless communication (e.g., Wireless Fidelity (Wi-Fi), Light Fidelity (Li-Fi), Bluetooth, Bluetooth Low Energy (BLE), ZigBee, and Near-Field Communication (NFC). Further, the screen printer 110 may be connected with an inspection device 121 and a processor 124 via communication lines, thereby setting up a connection so that data communication may be performed therebetween.

In one exemplary embodiment, the control parameter generation device 120 may include the inspection device 121, a memory 122, a communication circuit 123, and the processor 124. The inspection device 121 is illustrated as being included in the control parameter generation device 120 in FIG. 1 but is not necessarily limited thereto. For example, the inspection device 121 may be configured separately from the control parameter generation device 120. Further, the memory 122 and the processor 124 are illustrated as being configured separately from the inspection device 121 in FIG. 1 but are not necessarily limited thereto. In one exemplary embodiment, the memory 122 and the processor 124 may be included in the inspection device 121. In one exemplary embodiment, the memory 122 and the processor 124 may be present on a surface mount technology (SMT) line as an integrated server and may be located externally via a wired or wireless communication.

When the printed circuit board on which the solder paste is printed is transferred from the screen printer 110, the inspection device (SPI, solder paste inspection) 121 may inspect the printed state of the solder paste on the transferred printed circuit board. For example, the inspection device 121 may irradiate light to the printed circuit board on which the solder paste is printed, and may receive light reflected from the printed circuit board, thereby obtaining image data on the printed circuit board.

Further, the inspection device 121 may compare the image data on the printed circuit board with reference data for determining whether the printed state of the solder paste is good or bad, thereby inspecting whether the solder paste printed on the printed circuit board is defective. For example, the inspection device 121 may check whether the solder paste printed on the printed circuit board is printed in a proper amount at a proper position, thereby inspecting whether the solder paste is defective, and may generate inspection information indicating an inspection result.

In one exemplary embodiment, the inspection information may include at least one of a volume, an area, a height, a width, and a slope of the solder paste printed by the screen printer 110.

The memory 122 may store a simulation model for deriving predictive inspection information about the printed state of the solder paste based on a plurality of control parameters of the screen printer 110. The solder paste associated with the predictive inspection information may be a virtual solder paste generated by the simulation model. In one exemplary embodiment, the simulation model may include a machine learning-based regression model that is trained to derive the predictive inspection information indicating a predicted printed state of the solder paste based on the plurality of control parameters of the screen printer 110. For example, the machine learning-based regression model may be a machine learning-based model that simulates the actual conditions of the screen printer 110 and may be a model that adaptively changes depending on changes in the environment. For example, the machine learning-based regression model may be trained based on the control parameters of the screen printer 110 and the inspection information by the inspection device 121, and may generate predictive information on the printed state of the solder paste as a result of learning. In addition, the machine learning-based regression model may be trained based on print parameter information in addition to the control parameters and the inspection information.

In one exemplary embodiment, the predictive inspection information may include at least one of a volume, an area, a height, a width, and a slope of the first virtual solder paste. However, it is provided merely for illustration, and the present disclosure is not limited thereto. Instead, various information related to the solder paste, which can be inspected by the inspection device 121, may be used as the predictive inspection information.

In one exemplary embodiment, the print parameter information may indicate a parameter for printing the solder paste by the screen printer 110 and may include at least one of an ambient temperature of the screen printer 110, an ambient humidity of the screen printer 110, a shape of each of the pads of the printed circuit board, an area ratio of each of the pads of the printed circuit board, and an aspect ratio of each of the pads of the printed circuit board. However, these are provided merely for illustration, and the present disclosure is not limited thereto. Instead, various parameters that affect the printing of the solder paste by the screen printer 110 may be used as the print parameter information.

The memory 122 may further store at least two algorithms among an optimization algorithm, a search algorithm, and a machine learning-based reinforcement learning algorithm for generating a plurality of candidate control parameters for the screen printer 110. In one exemplary embodiment, the memory 122 may store the optimization algorithm and the search algorithm. In another exemplary embodiment, the memory 122 may store the optimization algorithm and the machine learning-based reinforcement learning algorithm. In still another exemplary embodiment, the memory 122 may store the search algorithm and the machine learning-based reinforcement learning algorithm. In yet another exemplary embodiment, the memory 122 may store the optimization algorithm, the search algorithm, and the machine learning-based reinforcement learning algorithm.

In one exemplary embodiment, the memory 122 may be a magnetic disk (e.g., a magnetic tape, a flexible disk, and a hard disk), an optical disk (e.g., a CD and a DVD), and a semiconductor memory (e.g., an RAM, an ROM, a flash memory, and a USB or SD card including a flash memory). However, these are merely for illustration, and the present disclosure is not limited thereto.

The communication circuit 123 may be connected to the screen printer 110 and the inspection device 121 via the network. In one exemplary embodiment, the communication circuit 123 may receive inspection information from the inspection device 121. In addition, the communication circuit 123 may transmit a control parameter generated by the processor 124 to the screen printer 110.

The processor 124 may be electrically connected to the memory 122 and the communication circuit 123. The processor 124 may load the simulation model stored in the memory 122 and may apply a control parameter to the loaded simulation model, thereby obtaining predictive inspection information indicating a predicted printed state of the solder paste. The solder paste associated with the predictive inspection information may be a virtual solder paste generated by the simulation model. Further, the processor 124 may generate a plurality of candidate control parameters based on the predictive inspection information, and may select a plurality of control parameters from among the plurality of candidate control parameters based on the inspection information and the predictive inspection information. The plurality of control parameters may be transmitted to the screen printer 110 via the communication circuit 123.

Figure 2A:
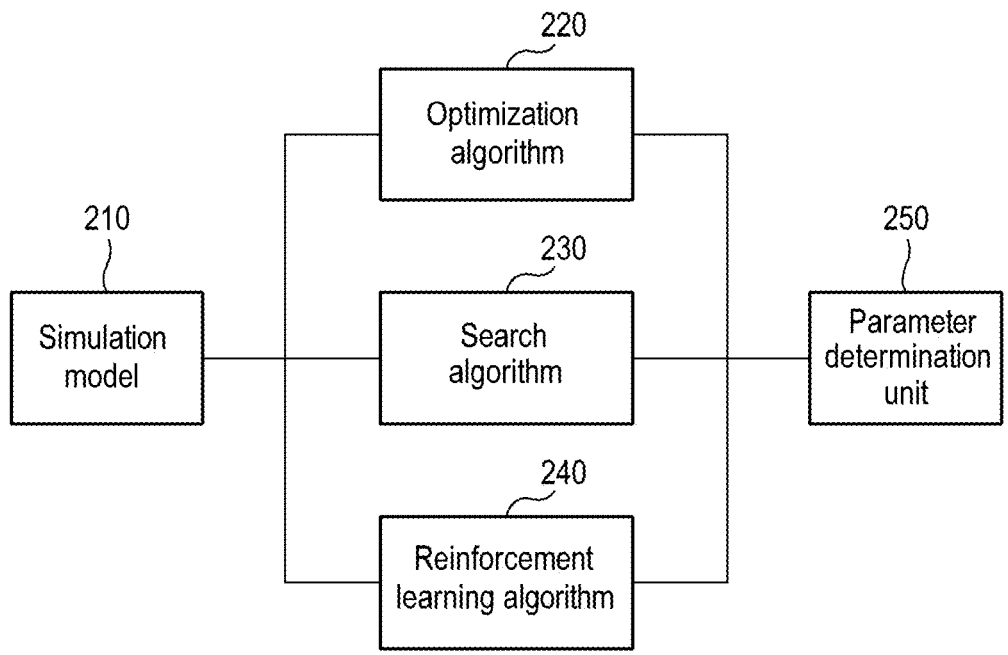
FIGS. 2A to 2D are block diagrams illustrating a configuration of a processor according to one exemplary embodiment of the present disclosure.

In one exemplary embodiment, as illustrated in FIG. 2A, the processor 124 may include a simulation model unit 210, an optimization algorithm unit 220, a search algorithm unit 230, a reinforcement learning algorithm unit 240, and a parameter determination unit 250.

The simulation model unit 210 may load the simulation model stored in the memory 122, and may apply a first control parameter to the simulation model, thereby generating predictive inspection information (hereinafter, referred to as "first predictive inspection information"). In one exemplary embodiment, the first control parameter may include at least one of the pressure applied to the squeegee blade of the screen printer 110, the moving speed of the squeegee blade, and the separation speed between the stencil mask and the printed circuit board. Further, the simulation model unit 210 may update the simulation model stored in the memory 122 based on inspection information corresponding to the first control parameter (hereinafter, referred to as "first inspection information") and the first predictive inspection information.

Figure 3:
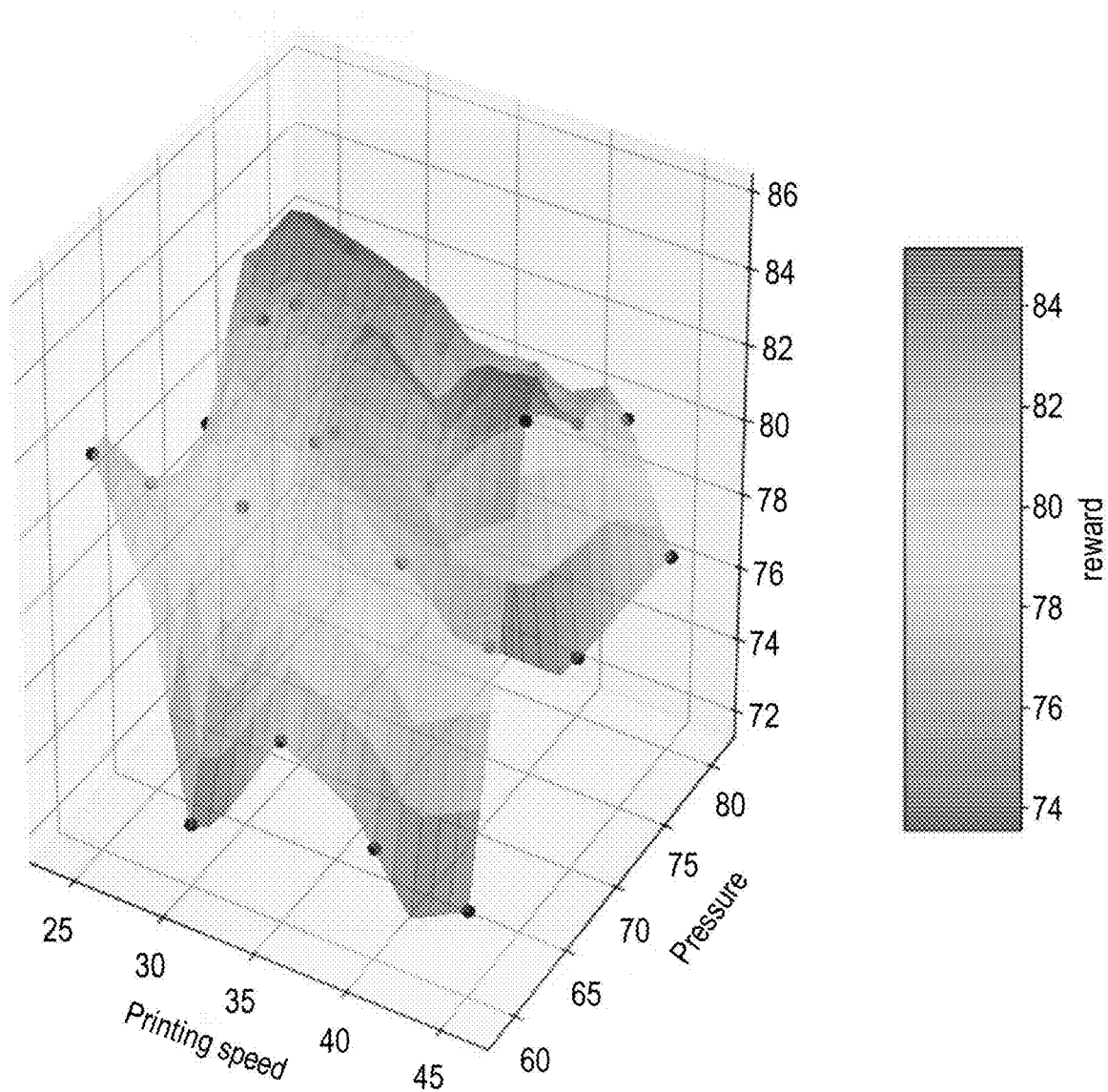
FIG. 3 illustrates an example of first predictive inspection information according to one exemplary embodiment of the present disclosure.

FIG. 3 illustrates an example of first predictive inspection information according to one exemplary embodiment of the present disclosure. FIG. 3 shows the first predictive inspection information (e.g., the volume of the solder paste) generated when a first control parameter including the moving speed (print speed) of the squeegee blade and the pressure applied to the squeegee blade is applied to the machine learning-based regression model according to the present embodiment. This first predictive inspection information may be used to generate control parameters for the screen printer 110 along with the inspection information by the inspection device 121. A reward refers to a print quality index of the solder paste, and the quality index may include a volume, an average volume, a volume standard deviation, a process capability index (CPK), a Zscore, cumulative distribution function of solder applied. FIG. 3 shows the volume of lead applied as the reward.

The optimization algorithm unit 220 may load the optimization algorithm stored in the memory 122, and may apply the first predictive inspection information generated by the simulation model unit 210 to the optimization algorithm, thereby generating a plurality of candidate control parameters (hereinafter, "first candidate control parameters"). In one exemplary embodiment, the optimization algorithm may include a mathematical optimization method, for example, a gradient descent method, a simulated annealing method or the like. The optimization algorithm may generate a first candidate control parameter that is close to an optimal control parameter as the match rate between the machine learning-based regression model and an actual solder paste print process is higher.

Figure 4:
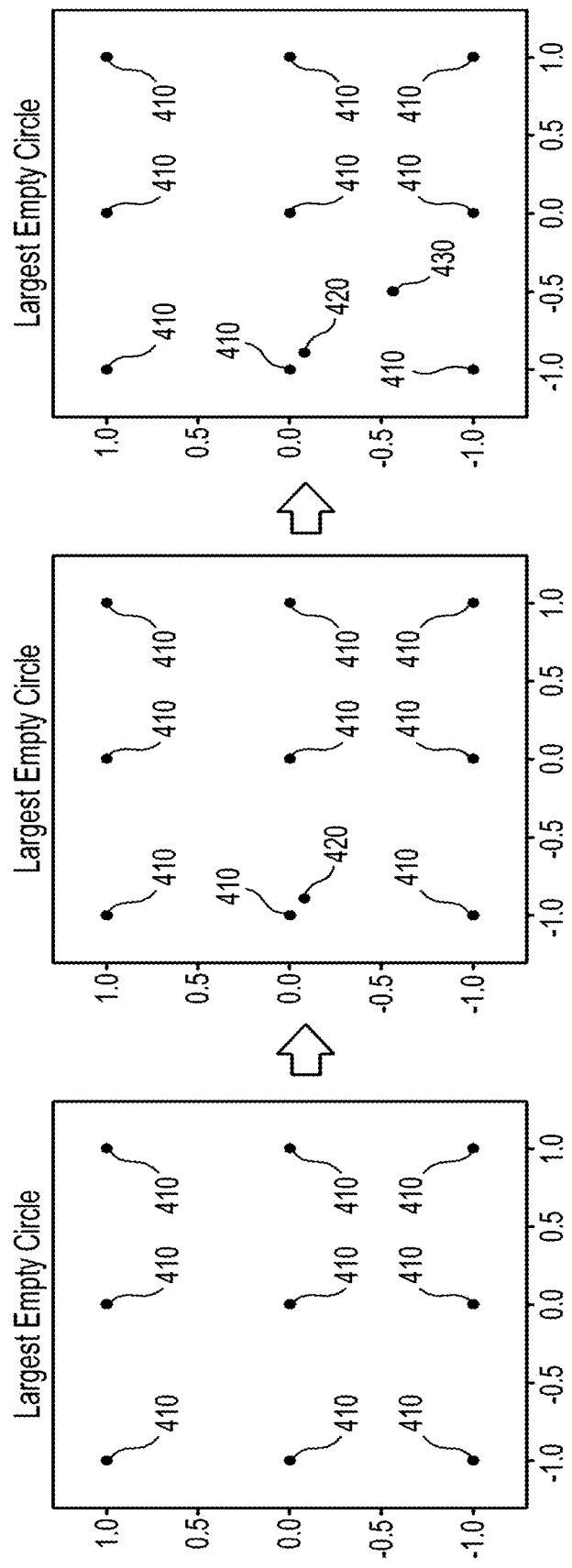
FIG. 4 illustrates an example of a search algorithm according to one exemplary embodiment of the present disclosure.

The search algorithm unit 230 may load the search algorithm stored in the memory 122, and may apply the first predictive inspection information generated by the simulation model unit 210 to the search algorithm, thereby generating a plurality of candidate control parameters (hereinafter, "second candidate control parameters"). In one exemplary embodiment, the search algorithm may be an algorithm for finding data that meets a certain condition or property from a given data set. For example, as shown in FIG. 4, the search algorithm unit 230 may apply first predictive inspection information 420 to the search algorithm, thereby selecting four pieces of predictive inspection information 410 based on the first predictive inspection information 420, detecting predictive inspection information 430 positioned at the center of the four pieces of selected predictive inspection information 410, and generating a control parameter corresponding to the detected predictive inspection information 430 as a second candidate control parameter corresponding to the first predictive inspection information 420.

The reinforcement learning algorithm unit 240 may load the machine learning-based reinforcement learning algorithm stored in the memory 122, and may apply the first control parameter and the first predictive inspection information to the machine learning-based reinforcement learning algorithm, thereby generating a plurality of candidate controls parameters (hereinafter, referred to as "third candidate control parameters"). In one exemplary embodiment, the machine learning-based reinforcement learning algorithm is an algorithm of selecting and conducting one of the possible actions in a condition and receiving a reward resulting from the action, which can recommend a candidate control parameter corresponding to the first predictive inspection information by learning a tuning policy of the control parameter. For example, the machine learning-based reinforcement learning algorithm may include a Q-learning algorithm, a Deep-Q-Network (DQN) algorithm or the like.

The parameter determination unit 250 may generate a plurality of control parameters (hereinafter, referred to as "second control parameters") based on the plurality of first candidate control parameters, the plurality of second candidate control parameters, and the plurality of third candidate control parameters. In one exemplary embodiment, the parameter determination unit 250 may generate the plurality of second control parameters among the plurality of first candidate control parameters, the plurality of second candidate control parameters, and the plurality of third candidate control parameters based on the first inspection information and the first predictive inspection information.

Figure 2B:
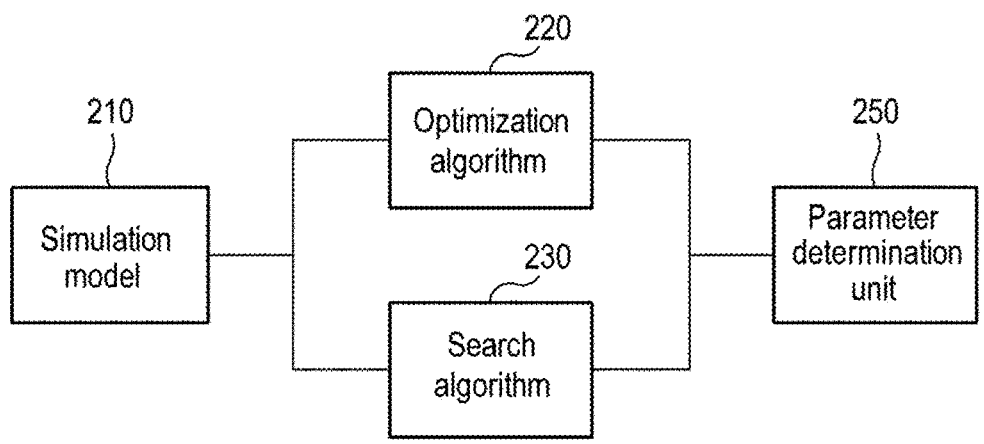

In another exemplary embodiment, as illustrated in FIG. 2B, the processor 124 may include the simulation model unit 210, the optimization algorithm unit 220, the search algorithm unit 230, and the parameter determination unit 250. In the present embodiment, the parameter determination unit 250 may generate the plurality of second control parameters based on the plurality of first candidate control parameters generated by the optimization algorithm unit 220 and the plurality of second candidate control parameters generated by the search algorithm unit 230.

Figure 2C:
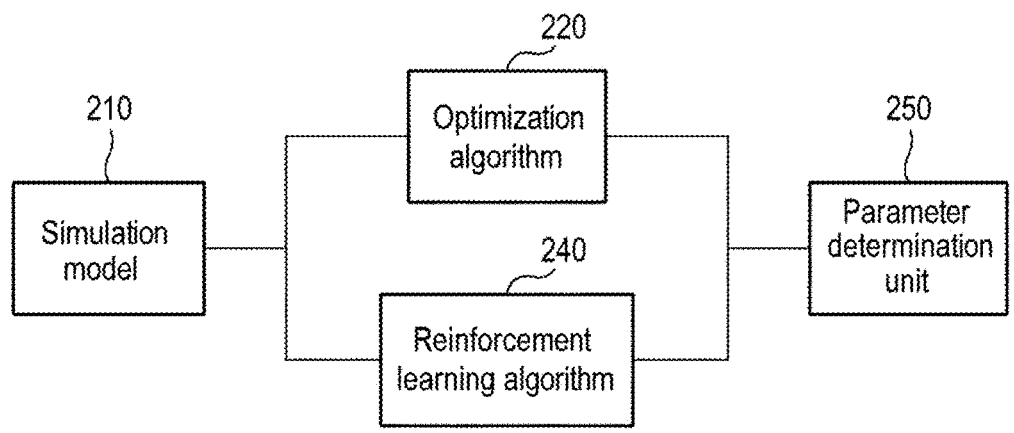

In still another exemplary embodiment, as illustrated in FIG. 2C, the processor 124 may include the simulation model unit 210, the optimization algorithm unit 220, the reinforcement learning algorithm unit 240, and the parameter determination unit 250. In the present embodiment, the parameter determination unit 250 may generate the plurality of second control parameters based on the plurality of first candidate control parameters generated by the optimization algorithm unit 220 and the plurality of third candidate control parameters generated by the reinforcement learning algorithm unit 240.

Figure 2D:
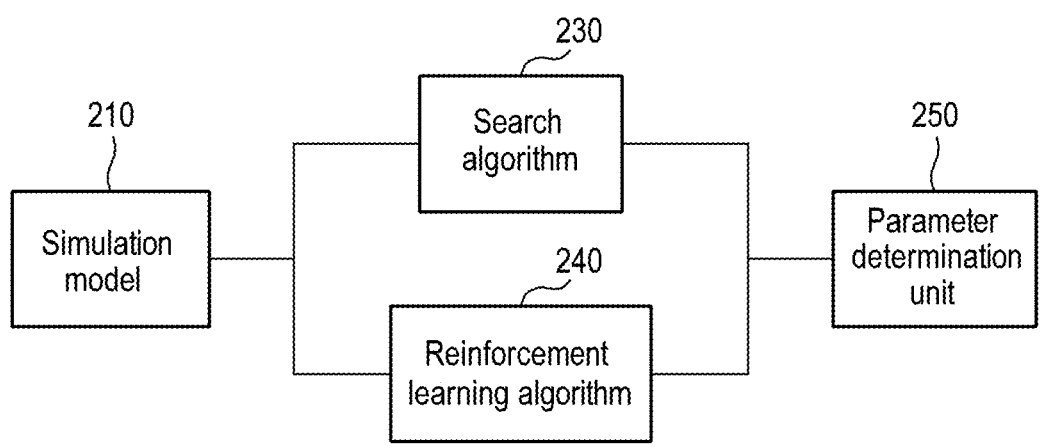

In yet another exemplary embodiment, as illustrated in FIG. 2D, the processor 124 may include the simulation model unit 210, the search algorithm unit 230, the reinforcement learning algorithm unit 240, and the parameter determination unit 250. In the present embodiment, the parameter determination unit 250 may generate the plurality of second control parameters based on the plurality of second candidate control parameters generated by the search algorithm unit 230 and the plurality of third candidate control parameters generated by the reinforcement learning algorithm unit 240.

Although process steps, method steps, algorithms, or the like in the flowcharts illustrated in the present disclosure may be described in a sequential order, such processes, methods, and algorithms may generally be configured to work in any practical order. In other words, processes, methods, and algorithms described in various exemplary embodiments of the present disclosure may not necessarily be performed in the order described herein. Further, some steps may be performed simultaneously despite being described or implied as occurring non-simultaneously. Moreover, the illustration of a process by its depiction in a drawing does not imply that the illustrated process is exclusive of other variations and modifications thereto, does not imply that the illustrated process or any of its steps are necessary to one or more of various exemplary embodiments of the present disclosure, and does not imply that the illustrated process is preferred.

Figure 5:
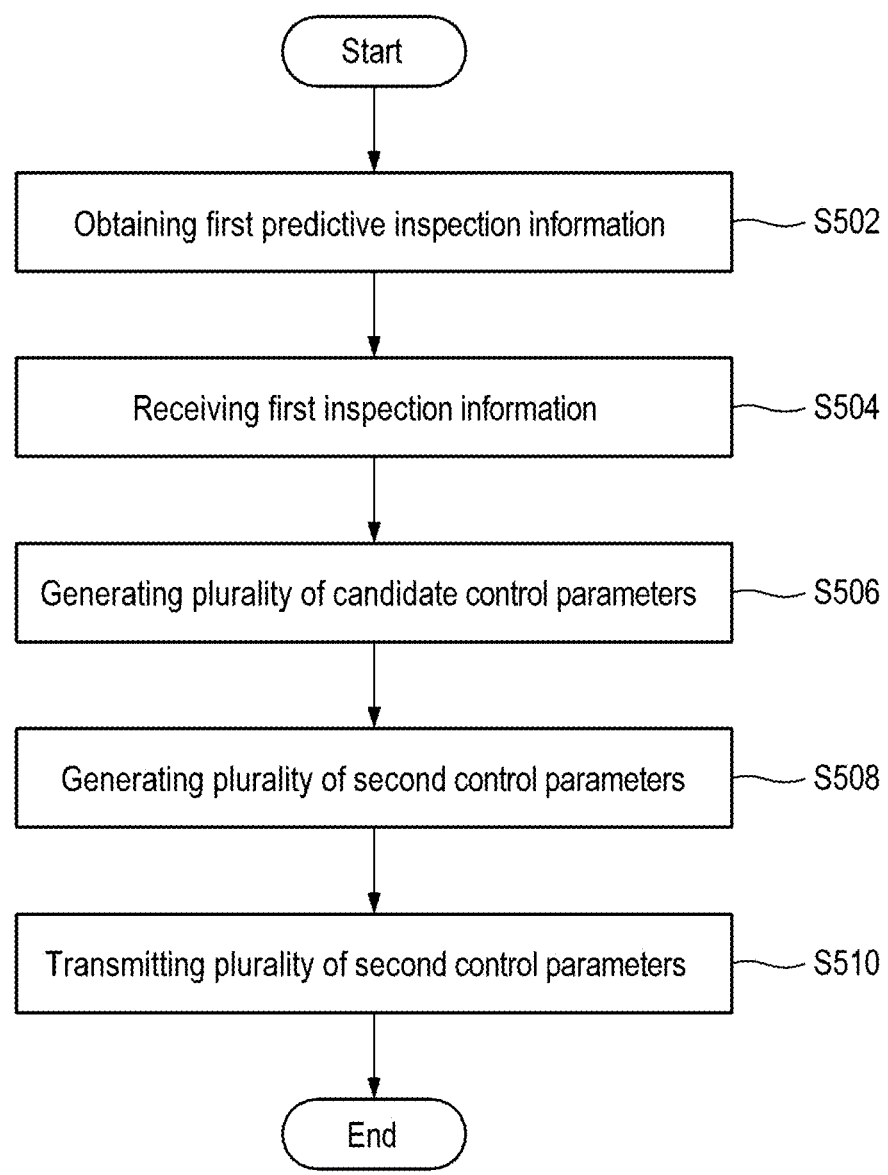
FIG. 5 is a flowchart illustrating a method of providing a plurality of second control parameters according to one exemplary embodiment of the present disclosure.

FIG. 5 is a flowchart illustrating a method of providing a plurality of control parameters according to one exemplary embodiment of the present disclosure.

In step S502, the processor 124 may obtain first predictive inspection information based on a first control parameter. For example, the processor 124 may apply the first control parameter to the simulation model, thereby obtaining the first predictive inspection information.

In step S504, the processor 124 may receive first inspection information corresponding to the first control parameter. In one exemplary embodiment, the first inspection information may include at least one of the volume, area, height, width, and slope of the solder paste. For example, the processor 124 may receive the first inspection information corresponding to the first control parameter from the inspection device 121 via the communication circuit 123.

In step S506, the processor 124 may generate a plurality of candidate control parameters based on the first predictive inspection information. In one exemplary embodiment, the processor 124 may apply the first predictive inspection information to an optimization algorithm and a search algorithm, which are stored in the memory 122, thereby generating the plurality of candidate control parameters. In another embodiment, the processor 124 may apply the first predictive inspection information to the optimization algorithm and a machine learning-based reinforcement learning algorithm, which are stored in memory 122, thereby generating the plurality of candidate control parameters. In still another embodiment, the processor 124 may apply the first predictive inspection information to the search algorithm and the machine learning-based reinforcement learning algorithm, which are stored in memory 122, thereby generating the plurality of candidate control parameters. In yet another embodiment, the processor 124 may apply the first predictive inspection information to the optimization algorithm, the search algorithm, and the machine learning-based reinforcement learning algorithm, which are stored in memory 122, thereby generating the plurality of candidate control parameters.

In step S508, the processor 124 may generate a plurality of second control parameters from the plurality of candidate control parameters based on the first inspection information and the first predictive inspection information. For example, the processor 124 may select the plurality of second control parameters from among the plurality of candidate control parameters based on the first inspection information and the first predictive inspection information.

In step S510, the processor 124 may transmit the plurality of second control parameters to the screen printer 110. For example, the processor 124 may transmit the plurality of second control parameters to the screen printer 110 via the communication circuit 123.

Figure 6:
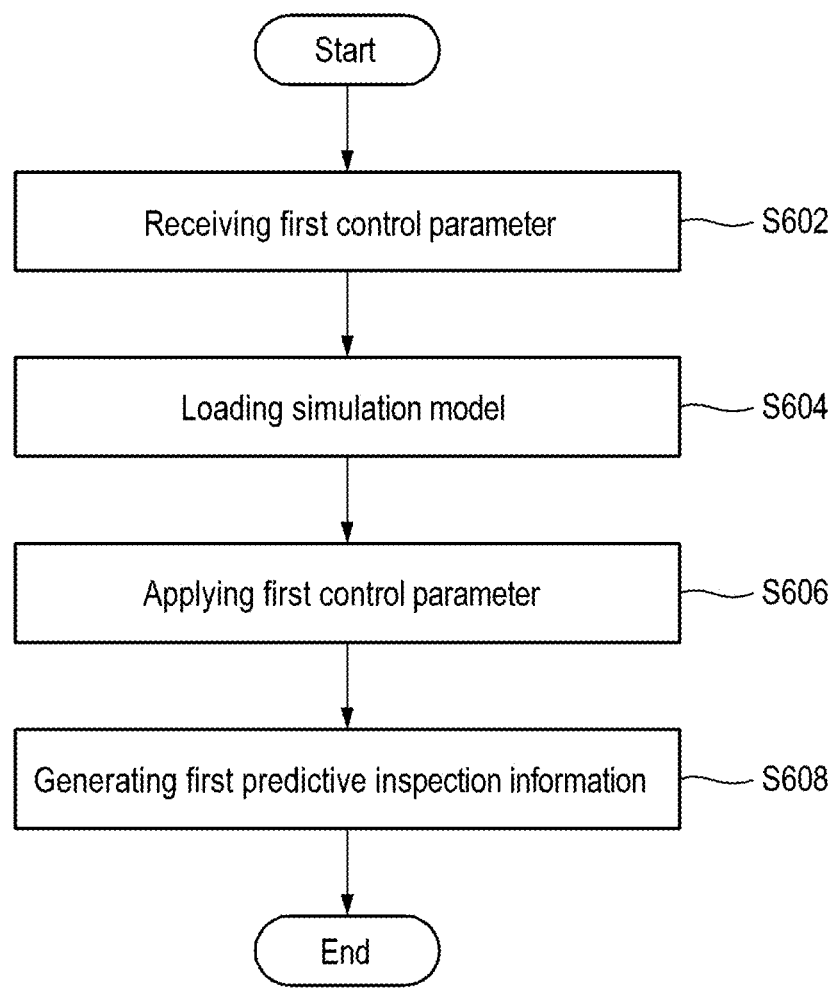
FIG. 6 is a flowchart illustrating a method of generating first predictive inspection information according to one exemplary embodiment of the present disclosure.

FIG. 6 is a flowchart illustrating a method of generating first predictive inspection information according to one exemplary embodiment of the present disclosure.

In step S602, the processor 124 may receive a first control parameter. In one exemplary embodiment, the first control parameter may be received via a user input unit (not shown) of the inspection system 100. In another embodiment, the first control parameter may be received from the screen printer 110 via the communication circuit 123.

In step S604, the processor 124 may load a simulation model. In one exemplary embodiment, the simulation model unit 210 of the processor 124 may connect to the memory 122 upon receipt of the first control parameter, and may load the simulation model stored in the memory 122.

In step S606, the processor 124 may apply the first control parameter to the loaded simulation model. In one exemplary embodiment, the simulation model unit 210 of the processor 124 may apply the first control parameter to the simulation model.

In step S608, the processor 124 may generate first predictive inspection information about the printed state of solder paste corresponding to the first control parameter. The solder paste associated with the predictive inspection information may be a virtual solder paste generated by the simulation model. In one exemplary embodiment, the first predictive inspection information may be generated as an output from the simulation model. For example, the simulation model unit 210 of the processor 124 may input the first control parameter to the simulation model, thereby generating the first predictive inspection information corresponding to the first control parameter, as shown in FIG. 3.

Figure 7:
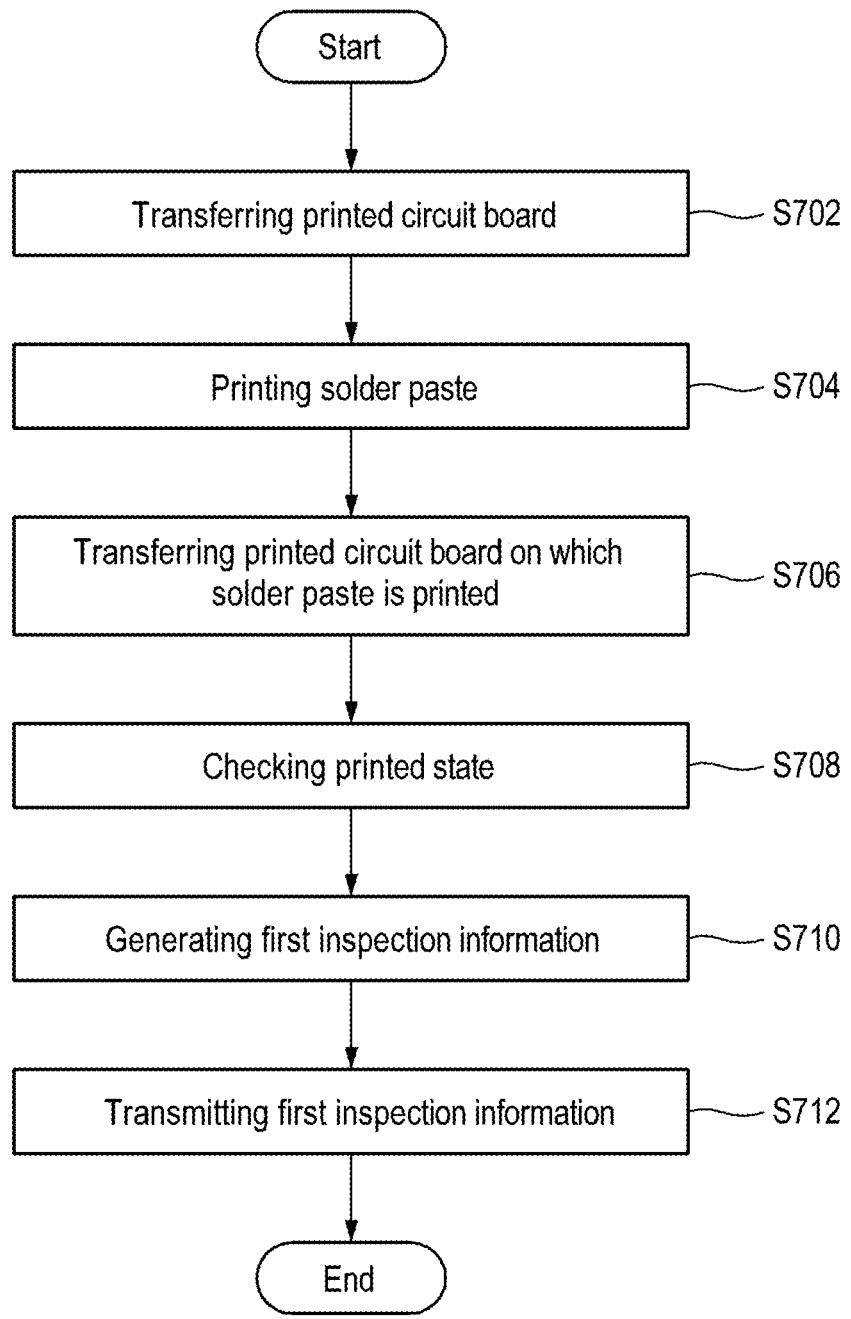
FIG. 7 is a flowchart illustrating a method of providing first inspection information according to one exemplary embodiment of the present disclosure.

FIG. 7 is a flowchart illustrating a method of generating first inspection information according to one exemplary embodiment of the present disclosure.

In step S702, the screen printer 110 may receive a printed circuit board. In one exemplary embodiment, the printed circuit board on which solder paste is to be printed may be transferred from the outside to the screen printer 110.

In step S704, the screen printer 110 may print the solder paste on the transferred printed circuit board based on a first control parameter. In one exemplary embodiment, the screen printer 110 may set the first control parameter as a control parameter of the screen printer 110, and may print the solder paste on each of a plurality of pads of the printed circuit board according to the set first control parameter.

In step S706, the inspection device 121 may receive the printed circuit board on which the solder paste is printed. In one exemplary embodiment, the printed circuit board on which the screen printer 110 has completed printing the solder paste may be transferred to the inspection device 121.

In step S708, the inspection device 121 may check the printed state of the printed circuit board on which the solder paste is printed. In one exemplary embodiment, the inspection device 121 may irradiate light to the printed circuit board on which the solder paste is printed, and may receive light reflected from the printed circuit board, thereby obtaining image data corresponding to the printed circuit board. In addition, the inspection device 121 may inspect the printed state (for example, at least one of the volume, area, height, width, and slope) of the solder paste with reference to the image data based on reference data for determining whether the printed state of the solder paste is good or bad.

In step S710, the inspection device 121 may generate first inspection information corresponding to the first control parameter. In one exemplary embodiment, the inspection device 121 may generate the first inspection information (for example, inspection information about at least one of the volume, area, height, width, and slope of the solder paste) obtained by inspecting the printed state of the solder paste printed on the printed circuit board by the screen printer 110 according to the first control parameter.

In step S712, the inspection device 121 may transmit the first inspection information via the communication circuit 123.

Figure 8:
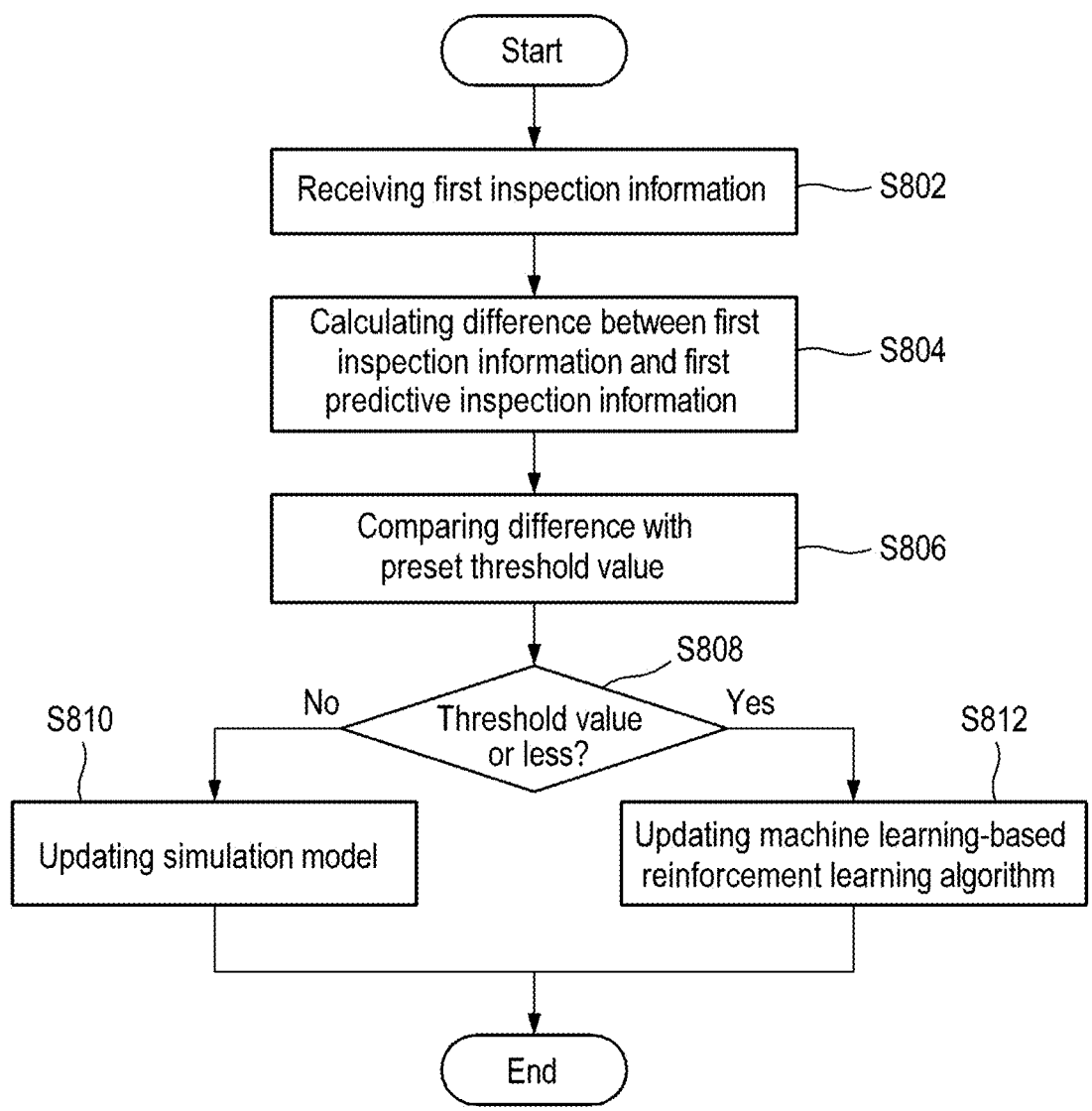
FIG. 8 is a flowchart illustrating a method of updating a simulation model and a reinforcement learning algorithm according to one exemplary embodiment of the present disclosure.

FIG. 8 is a flowchart illustrating a method of updating a simulation model and a reinforcement learning algorithm according to one exemplary embodiment of the present disclosure.

In step S802, the processor 124 may receive first inspection information. In one exemplary embodiment, the parameter determination unit 250 of the processor 124 may receive the first inspection information from the inspection device 121 via the communication circuit 123.

In step S804, the processor 124 may calculate a difference between the first inspection information and the first predictive inspection information. In one exemplary embodiment, the difference between the first inspection information and the first predictive inspection information may be calculated by Equation 1 below.

$$E = \frac{B_R - R(B_P)}{n} \quad \text{[Equation 1]}$$

In Equation 1, E represents the difference, $B_R$ represents inspection information, $R(B_P)$ represents predictive information, n represents the number of control parameters (i.e., the number of printed circuit boards on which solder paste is printed by the screen printer 110).

For example, the parameter determination unit 250 of the processor 124 may apply the first inspection information to $B_R$ in Equation 1, apply the first predictive inspection information to $R(B_P)$ in Equation 1, and apply the number of first control parameters to n (e.g., n=1) in Equation 1, thereby calculating the difference between the first inspection information and the first predictive inspection information.

In step S806, the processor 124 may compare the difference between the first inspection information and the first predictive inspection information with a predetermined threshold value. In operation S808, the processor 124 may determine whether the difference between the first inspection information and the first predictive inspection information is less than or equal to the predetermined threshold value. For example, the parameter determination unit 250 of the processor 124 may compare the calculated difference with the predetermined threshold value, and may determine whether the calculated difference is less than or equal to the predetermined threshold value.

If it is determined that the difference between the first inspection information and the first predictive inspection information exceeds the predetermined threshold value in step S808, the processor 124 may update a simulation model based on the first inspection information and the first predictive inspection information in step S810. For example, the parameter determination unit 250 of the processor 124 may update the first predictive inspection information corresponding to the first control parameter to the first inspection information for the simulation model stored in the memory 122.

Meanwhile, if it is determined that the difference between the first inspection information and the first predictive inspection information is less than or equal to the predetermined threshold value in step S808, the processor 124 may update a machine learning-based reinforcement learning algorithm based on the simulation model in step S812. For example, the parameter determination unit 250 of the processor 124 may apply a plurality of control parameters of the simulation model stored in the memory 122 and the predictive inspection information corresponding to the control parameters to the machine learning-based reinforcement learning algorithm stored in the memory 122, thereby updating the machine learning-based reinforcement learning algorithm.

Figure 9:
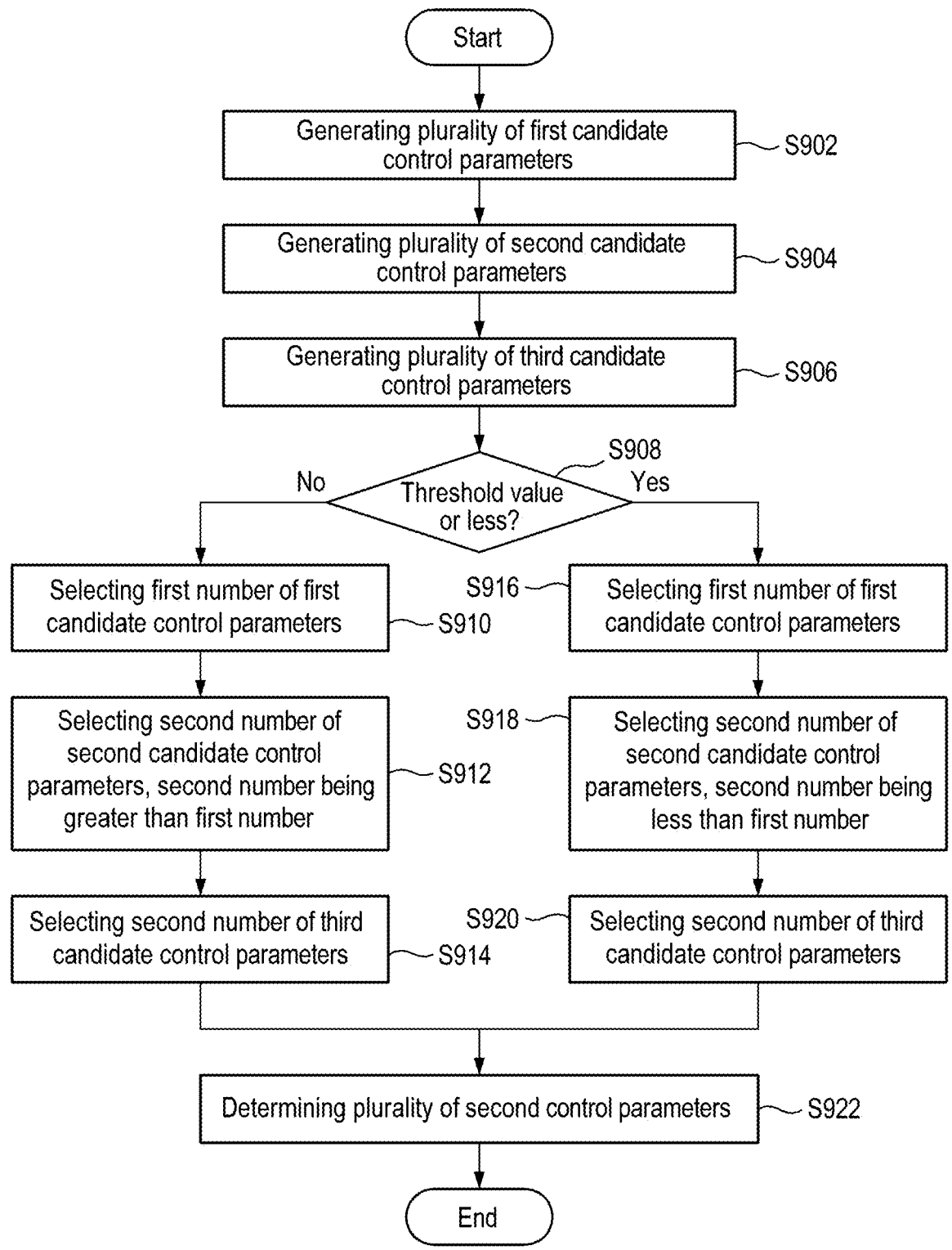
FIG. 9 is a flowchart illustrating a method of determining the plurality of second control parameters according to one exemplary embodiment of the present disclosure.

FIG. 9 is a flowchart illustrating a method of determining a plurality of second control parameters according to one exemplary embodiment of the present disclosure.

In step S902, the processor 124 may generate a plurality of candidate control parameters (hereinafter, referred to as "first candidate control parameters") by applying first predictive inspection information to an optimization algorithm. In step S904, the processor 124 may generate a plurality of candidate control parameters (hereinafter, referred to as "second candidate control parameters") by applying the first predictive inspection information to a search algorithm. In step S906, the processor 124 may generate a plurality of candidate control parameters (hereinafter, referred to as "third candidate control parameters") by applying a first control parameter and the first predictive inspection information to a machine learning-based reinforcement learning algorithm.

For example, the optimization algorithm unit 220 of the processor 124 may load the optimization algorithm from the memory 122, and may apply the first predictive inspection information generated by the simulation model unit 210 to the optimization algorithm, thereby generating the plurality of first candidate control parameters. Further, the search algorithm unit 230 of the processor 124 may load the search algorithm from the memory 122, and may apply the first predictive inspection information generated by the simulation model unit 210 to the search algorithm, thereby generating the plurality of second candidate control parameters. In addition, the reinforcement learning algorithm unit 240 of the processor 124 may load the machine learning-based reinforcement learning algorithm from the memory 122, and may apply the first control parameter and the first predictive inspection information generated by the simulation model unit 210 to the machine learning-based reinforcement learning algorithm, thereby generating the plurality of third candidate control parameters.

In step S908, the processor 124 may compare the difference between first inspection information and the first predictive inspection information with a predetermined threshold value, thereby determining whether the difference between the first inspection information and the first predictive inspection information is less than or equal to the predetermined threshold value.

If it is determined that the difference between the first inspection information and the first predictive inspection information exceeds the predetermined threshold value in step S908, the processor 124 may select a first number of first candidate control parameters from among the plurality of first candidate control parameters in operation S910. In step S912, the processor 124 may select a second number of second candidate control parameters from among the plurality of second candidate control parameters, where the second number is greater than the first number, in operation S912. In step S914, the processor 124 may select the second number of third candidate control parameters from among the plurality of third candidate control parameters in operation.

For example, the parameter determination unit 250 of the processor 124 may arrange the plurality of first candidate control parameters as shown in FIG. 10. In one exemplary embodiment, the parameter determination unit 250 may obtain a process capability index (CPK) for each of the plurality of first candidate control parameters, calculate a Z-score of the obtained process capability index, and arrange the plurality of first candidate control parameters according to the calculated Z-score. The parameter determination unit 250 may select the first number (e.g., two) of first candidate control parameters ($P_{O1}$ and $P_{O2}$) from among the plurality of first candidate control parameters ($P_{O1}$ to $P_{O10}$) illustrated in FIG. 10.

Further, the parameter determination unit 250 may obtain the process capability index for each of the plurality of second candidate control parameters, calculate the Z-score of the obtained process capability index, and arrange the plurality of second candidate control parameters according to the calculated Z-score as shown in FIG. 10. The parameter determination unit 250 may select the second number (e.g., four) of second candidate control parameters ($P_{L1}$ to $P_{L4}$) from among the plurality of second candidate control parameters ($P_{L1}$ to $P_{L10}$) illustrated in FIG. 10, where the second number is greater than the first number.

In addition, the parameter determination unit 250 may obtain the process capability index for each of the plurality of third candidate control parameters, calculate the Z-score of the obtained process capability index, and arrange the plurality of third candidate control parameters according to the calculated Z-score as shown in FIG. 10. The parameter determination unit 250 may select the second number (for example, four) of third candidate control parameters ($P_{R1}$ to $P_{R4}$) from among the plurality of third candidate control parameters ($P_{R1}$ to $P_{R10}$) illustrated in FIG. 10.

If it is determined that the difference between the first inspection information and the first predictive inspection information is less than or equal to the predetermined threshold value in step S908, the processor 124 may select a first number of first candidate control parameters from among the plurality of first candidate control parameters in step S916. Further, in step S918, the processor 124 may select a second number of second candidate control parameters from among the plurality of second candidate control parameters, where the second number is less than the first number. In addition, in step S920, the processor 124 may select a second number of third candidate control parameters from among the plurality of third candidate control parameters.

For example, the parameter determination unit 250 of the processor 124 may obtain the process capability index for each of the plurality of first candidate control parameters, calculate the Z-score of the obtained process capability index, and arrange the plurality of first candidate control parameters according to the calculated Z-score as shown in FIG. 10. The parameter determination unit 250 may select the first number (for example, eight) of first candidate control parameters ($P_{O1}$ to $P_{O8}$) from among the plurality of first candidate control parameters ($P_{O1}$ to $P_{O10}$) shown in FIG. 10.

Further, the parameter determination unit 250 may obtain the process capability index for each of the plurality of second candidate control parameters, calculate the Z-score of the obtained process capability index, and arrange the plurality of second candidate control parameters according to the calculated Z-score as shown in FIG. 10. The parameter determination unit 250 may select the second number (for example, one) of second candidate control parameter ($P_{L1}$) from among the plurality of second candidate control parameters ($P_{L1}$ to $P_{L10}$) shown in FIG. 10, where the second number is less than the first number.

In addition, the parameter determination unit 250 may obtain the process capability index for each of the plurality of third candidate control parameters, calculate the Z-score of the obtained process capability index, and arrange the plurality of third candidate control parameters according to the calculated Z-score as shown in FIG. 10. The parameter determination unit 250 may select the second number (for example, one) of third candidate control parameter ($P_{R1}$) from among the plurality of third candidate control parameters ($P_{R1}$ to $P_{R10}$) shown in FIG. 10.

In step S922, the processor 124 may determine a plurality of second control parameters based on the selected first candidate control parameters, the selected second candidate control parameters, and the selected third candidate control parameters. In one exemplary embodiment, the parameter determination unit 250 of the processor 124 may determine a plurality of second control parameters ($P_{O1}$, $P_{O2}$, $P_{L1}$, $P_{L2}$, $P_{L3}$, $P_{L4}$, $P_{R1}$, $P_{R2}$, $P_{R3}$, and $P_{R4}$) based on the selected first candidate control parameters ($P_{O1}$ and $P_{O2}$), the selected second candidate control parameters ($P_{L1}$ to $P_{L4}$), and the selected third candidate control parameters ($P_{R1}$ to $P_{R4}$). In another exemplary embodiment, the parameter determination unit 250 may determine a plurality of second control parameters ($P_{O1}$, $P_{O2}$, $P_{O3}$, $P_{O4}$, $P_{O5}$, $P_{O6}$, $P_{O7}$, $P_{O8}$, $P_{L1}$, $P_{R1}$) based on the selected first candidate control parameters ($P_{O1}$ to $P_{O8}$), the selected second candidate control parameter ($P_{L1}$), and the selected third candidate control parameter ($P_{R1}$).

Although the aforementioned embodiment shows that a plurality of second control parameters is determined based on the plurality of first candidate control parameters, the plurality of second candidate control parameters, and the plurality of third candidate control parameters, the present disclosure may not be limited thereto.

In another exemplary embodiment, the processor 124 may generate a plurality of first candidate control parameters by applying the first predictive inspection information to the optimization algorithm, and generate a plurality of second candidate control parameters by applying the first predictive inspection information to the search algorithm. If it is determined that the difference between first inspection information and the first predictive inspection information exceeds the predetermined threshold value, the processor 124 may select a first number of first candidate control parameters from among the plurality of first candidate control parameters, and select a second number of second candidate control parameters from among the plurality of second candidate control parameters, where the second number is greater than the first number. If it is determined that the difference between the first inspection information and the first predictive inspection information is less than or equal to the predetermined threshold value, the processor 124 may select a first number of first candidate control parameters from among the plurality of first candidate control parameters, and select a second number of second candidate control parameters from among the plurality of second candidate control parameters, where the second number is less than the first number. The processor 124 may generate the plurality of second control parameters based on the selected first candidate control parameters and the selected second candidate control parameters.

In still another exemplary embodiment, the processor 124 may generate a plurality of first candidate control parameters by applying the first predictive inspection information to the optimization algorithm, and generate a plurality of third candidate control parameters by applying the first control parameter and the first predictive inspection information to the machine learning-based reinforcement learning algorithm. If it is determined that the difference between first inspection information and the first predictive inspection information exceeds the predetermined threshold value, the processor 124 may select a first number of first candidate control parameters from among the plurality of first candidate control parameters, and select a second number of third candidate control parameters from among the plurality of third candidate control parameters, where the second number is greater than the first number. If it is determined that the difference between the first inspection information and the first predictive inspection information is less than or equal to the predetermined threshold value, the processor 124 may select a first number of first candidate control parameters from among the plurality of first candidate control parameters, and select a second number of third candidate control parameters from among the plurality of third candidate control parameters, where the second number is less than the first number. The processor 124 may generate the plurality of second control parameters based on the selected first candidate control parameters and the selected third candidate control parameters.

In yet another exemplary embodiment, the processor 124 may generate a plurality of second candidate control parameters by applying the first predictive inspection information to the search algorithm, and generate a plurality of third candidate control parameters by applying the first control parameter and the first predictive inspection information to the machine learning-based reinforcement learning algorithm. If it is determined that the difference between first inspection information and the first predictive inspection information exceeds the predetermined threshold value, the processor 124 may select a first number of second candidate control parameters from among the plurality of second candidate control parameters, and select a second number of third candidate control parameters from among the plurality of third candidate control parameters, where the second number is greater than the first number. Meanwhile, if it is determined that the difference between the first inspection information and the first predictive inspection information is less than or equal to the predetermined threshold value, the processor 124 may select a first number of second candidate control parameters from among the plurality of second candidate control parameters and may select a second number of third candidate control parameters from among the plurality of third candidate control parameters, where the second number is less than the first number. The processor 124 may generate the plurality of second control parameters based on the selected second candidate control parameters and the selected third candidate control parameters.

FIG. 11 is a flowchart illustrating a method of selecting one control parameter from among a plurality of control parameters according to one exemplary embodiment of the present disclosure.

In step S1102, the processor 124 may generate second predictive inspection information corresponding to each of the plurality of second control parameters based on the simulation model. For example, the simulation model unit 210 of the processor 124 may load the simulation model from the memory 122, and apply each of the plurality of second parameters to the simulation model, thereby generating the second predictive inspection information on printed states of a plurality of second virtual solder pastes.

In step S1104, the processor 124 may receive second inspection information corresponding to each of the plurality of second control parameters. In one exemplary embodiment, the parameter determination unit 250 of the processor 124 may receive the second inspection information corresponding to each of the plurality of second parameters from the inspection device 121 via the communication circuit 123. For example, the screen printer 110 may print solder paste on a printed circuit board based on each of the plurality of second control parameters. Further, the inspection device 121 may inspect the solder paste on each of a plurality of printed circuit boards, thereby generating the second inspection information corresponding to each of the plurality of second control parameters. The inspection device 121 may transmit the generated second inspection information to the communication circuit 123. Therefore, the parameter determination unit 250 may receive the second inspection information corresponding to each of the plurality of second control parameters via the communication circuit 123.

In step S1106, the processor 124 may calculate an average value of differences between the second inspection information and the second predictive inspection information. In one exemplary embodiment, the average value of the differences between the second inspection information and the second predictive inspection information may be calculated using Equation 1. For example, the parameter determination unit 250 of the processor 124 may apply the second inspection information corresponding to each of the plurality of second control parameters to $B_R$ in Equation 1, apply the second predictive inspection information corresponding to each of the plurality of second control parameters in $R(B_P)$ in Equation 1, and apply the number of second control parameters to n in Equation 1, thereby calculating the average value of the differences between the second inspection information and the second predictive inspection information.

In step S1108, the processor 124 may determine whether the calculated average value of the differences corresponds to a predetermined value. In one exemplary embodiment, the parameter determination unit 250 of the processor 124 may determine whether the calculated average value of the differences converges to the predetermined value. For example, the predetermined value may be 0 but is not necessarily limited thereto.

If it is determined that the calculated average value of the differences corresponds to the predetermined value (i.e., converges to the predetermined value) in step S1108, the processor 124 may select one control parameter (hereinafter, referred to as an "optimal control parameter") from among the plurality of second control parameters in step S1110. For example, the parameter determination unit 250 of the processor 124 may select, as an optimal control parameter, a control parameter ($P_{O1}$) having the highest Z-score from among the plurality of second control parameters ($P_{O1}$, $P_{O2}$, $P_{O3}$, $P_{O4}$, $P_{O5}$, $P_{O6}$, $P_{O7}$, $P_{O8}$, $P_{L1}$, $P_{R1}$).

In step S1112, the processor 124 may transmit the selected optimal control parameter to the screen printer 110. In one exemplary embodiment, the parameter determination unit 250 of the processor 124 may transmit the optimal control parameters to the screen printer 110 via the communication circuit 123. Therefore, the screen printer 110 may print the solder paste on the printed circuit board based on the optimal control parameter, thereby reducing the occurrence of defects on the printed circuit board.

Meanwhile, if it is determined that the calculated average value of the differences does not converge to the predetermined value in step S1108, steps S908 to S922 in FIG. 9 may be performed for each of the plurality of second control parameters.

While the foregoing methods have been described with reference to particular exemplary embodiments, it is also possible to implement the above methods as computer-readable codes on a computer-readable recording medium. The computer-readable recording medium includes any type of recording devices that store data which can be read by a computer system. Examples of the computer-readable recording medium include ROM, RAM, CD-ROM, a magnetic tape, a floppy disk, an optical data storage device, and the like. In addition, the computer-readable recording medium can be distributed over a network-connected computer system so that the computer-readable codes can be stored and executed in a distributed manner. Further, functional programs, codes, and code segments for implementing the above embodiments can be easily deduced by programmers of the art to which the present disclosure belongs.

According to various exemplary embodiments of the present disclosure, a control parameter for a screen printer may be generated using a regression model that simulates the actual conditions of the screen printer. Therefore, the screen printer may print solder paste on a printed circuit board (bare board) based on the generated control parameter, thereby reducing the occurrence of defects in the solder paste printed on the printed circuit board.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An apparatus for generating a control parameter of a screen printer, the apparatus comprising:
a memory that stores:
   a simulation model configured to derive predictive inspection information on printed states of a plurality of virtual solder pastes based on a plurality of control parameters of the screen printer; and
   at least two algorithms configured to generate a plurality of candidate control parameters for the screen printer;
a communication circuit configured to receive first inspection information on a plurality of solder pastes, the plurality of solder pastes being printed by the screen printer based on a first control parameter; and
a processor electrically connected to the memory and the communication circuit,
wherein the processor is configured to:
   obtain first predictive inspection information on a printed state of a first virtual solder paste by applying the first control parameter to the simulation model;
   generate a plurality of first candidate control parameters based on the first predictive inspection information and a first algorithm of the at least two algorithms;
   generate a plurality of second candidate control parameters based on the first predictive inspection information and a second algorithm of the at least two algorithms;
   determine a plurality of second control parameters among the plurality of first candidate control parameters and the plurality of second candidate control parameters based on whether a difference between the first inspection information and the first predictive inspection information is greater than a predetermined threshold value; and
   transmit the plurality of second control parameters to the screen printer via the communication circuit.

2. The apparatus of claim 1, wherein each of the first control parameter and the plurality of second control parameters comprises at least one of a pressure applied to a squeegee blade of the screen printer, a moving speed of the squeegee blade, and a separation speed between a stencil mask of the screen printer and a substrate.

3. The apparatus of claim 1, wherein the first inspection information comprises at least one of a volume, an area, a height, a width, and a slope of each of the plurality of solder pastes printed by the screen printer.

4. The apparatus of claim 1, wherein the first predictive inspection information comprises at least one of a volume, an area, a height, a width, and a slope of the first virtual solder paste.

5. The apparatus of claim 1, wherein the processor is further configured to:
   calculate the difference between the first inspection information and the first predictive inspection information;
   compare the calculated difference with the predetermined threshold value; and
   update the simulation model using the first inspection information and the first predictive inspection information, if it is determined that the calculated difference is greater than the predetermined threshold value.

6. The apparatus of claim 5, wherein the simulation model comprises a machine learning-based regression model that is trained to derive predictive inspection information indicating predicted printed states of the plurality of virtual solder pastes based on the plurality of control parameters of the screen printer.

7. The apparatus of claim 1, wherein the first algorithm is an optimization algorithm, and the second algorithm is a search algorithm, and wherein the processor is further configured to:
generate the plurality of first candidate control parameters by applying the first predictive inspection information to the optimization algorithm; and
generate the plurality of second candidate control parameters by applying the first predictive inspection information to the search algorithm.

8. The apparatus of claim 7, wherein the processor is further configured to:
calculate the difference between the first inspection information and the first predictive inspection information; and
compare the calculated difference with the predetermined threshold value.

9. The apparatus of claim 8, wherein the processor is further configured to, if the calculated difference is greater than the predetermined threshold value:
select a first number of first candidate control parameters from among the plurality of first candidate control parameters
select a second number of second candidate control parameters from among the plurality of second candidate control parameters, wherein the second number is greater than the first number; and
determine the plurality of second control parameters among the selected first candidate control parameters and the selected second candidate control parameters.

10. The apparatus of claim 8, wherein the processor is further configured to, if the calculated difference is less than or equal to the predetermined threshold value:
select a first number of first candidate control parameters from among the plurality of first candidate control parameters;
select a second number of second candidate control parameters from among the plurality of second candidate control parameters, wherein the second number is smaller than the first number; and
determine the plurality of second control parameters among selected first candidate control parameters and the selected second candidate control parameters.

11. The apparatus of claim 1, wherein the first algorithm is an optimization algorithm, and the second algorithm is a machine learning-based reinforcement learning algorithm, and
wherein the processor is further configured to:
generate the plurality of first candidate control parameters by applying the first predictive inspection information to the optimization algorithm; and
generate the plurality of second candidate control parameters by applying the first control parameter and the first predictive inspection information to the machine learning-based reinforcement learning algorithm.

12. The apparatus of claim 11, wherein the processor is further configured to:
calculate the difference between the first inspection information and the first predictive inspection information; and
compare the calculated difference with the predetermined threshold value.

13. The apparatus of claim 1, wherein the first algorithm is a search algorithm, and the second algorithm is a machine learning-based reinforcement learning algorithm, and
wherein the processor is further configured to:
generate the plurality of first candidate control parameters by applying the first predictive inspection information to the search algorithm; and
generate the plurality of second candidate control parameters by applying the first control parameter and the first predictive inspection information to the machine learning-based reinforcement learning algorithm.

14. The apparatus of claim 13, wherein the processor is configured to:
calculate the difference between the first inspection information and the first predictive inspection information; and
compare the calculated difference with the predetermined threshold value.

15. The apparatus of claim 1, wherein the first algorithm is an optimization algorithm, and the second algorithm is a search algorithm, and
wherein the processor is further configured to:
generate the plurality of first candidate control parameters by applying the first predictive inspection information to the optimization algorithm;
generate the plurality of second candidate control parameters by applying the first predictive inspection information to the search algorithm; and
generate a plurality of third candidate control parameters by applying the first control parameter and the first predictive inspection information to a machine learning-based reinforcement learning algorithm of the at least two algorithms.

16. The apparatus of claim 15, wherein the processor is further configured to:
calculate the difference between the first inspection information and the first predictive inspection information;
compare the calculated difference with the predetermined threshold value; and
determine the plurality of second control parameters among the plurality of first candidate control parameters, the plurality of second candidate control parameters, and the plurality of third candidate control parameters based on whether the calculated difference is greater than the predetermined threshold value.

17. The apparatus of claim 1, wherein the communication circuit is further configured to receive second inspection information corresponding to each of the plurality of second control parameters, and
wherein the processor is further configured to obtain second predictive inspection information on printed states of a plurality of second virtual solder pastes by applying each of the plurality of second control parameters to the simulation model.

18. The apparatus of claim 17, wherein the processor is further configured to:
calculate an average value of differences between the second inspection information and the second predictive inspection information;
select one of the plurality of second control parameters if the calculated average value corresponds to a predetermined value; and
transmit the selected second control parameter to the screen printer via the communication circuit.

19. A method of generating a control parameter of a screen printer, the method comprising:
obtaining first predictive inspection information on a printed state of a virtual solder paste by applying a first control parameter of the screen printer to a simulation model, the simulation model being associated with generating predictive inspection information on printed states of a plurality of virtual solder pastes based on a plurality of control parameters of the screen printer;

receiving first inspection information on printed states of a plurality of solder pastes, the plurality of solder pastes being printed by the screen printer based on the first control parameter;

generating a plurality of first candidate control parameters based on the first predictive inspection information and a first algorithm of at least two algorithms, the at least two algorithms for generating a plurality of candidate control parameters for the screen printer;

generating a plurality of second candidate control parameters based on the first predictive inspection information and a second algorithm of the at least two algorithms;

determining a plurality of second control parameters among the plurality of first candidate control parameters and the plurality of second candidate control parameters based on whether a difference between the first inspection information and the first predictive inspection information is greater than a predetermined threshold value; and transmitting the plurality of second control parameters to the screen printer.

\* \* \* \* \*